Aug. 20, 1957  M. OLLEY  2,803,140
WOBBLE PLATE ENGINE BALANCING MEANS
Filed Dec. 29, 1954  2 Sheets-Sheet 1

Inventor
Maurice Olley
By
S. C. Thorpe
Attorney

Aug. 20, 1957 M. OLLEY 2,803,140
WOBBLE PLATE ENGINE BALANCING MEANS
Filed Dec. 29, 1954 2 Sheets-Sheet 2
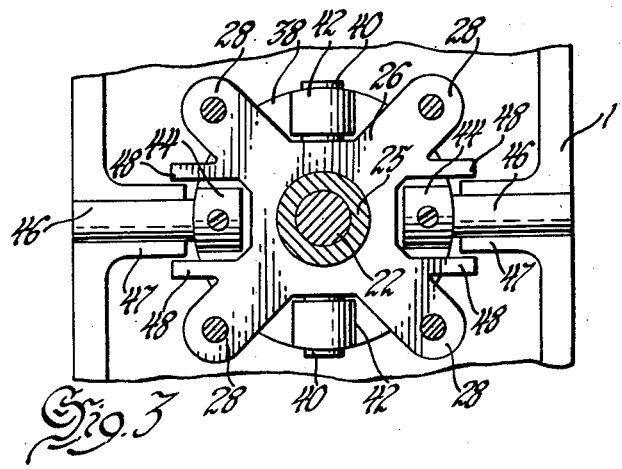
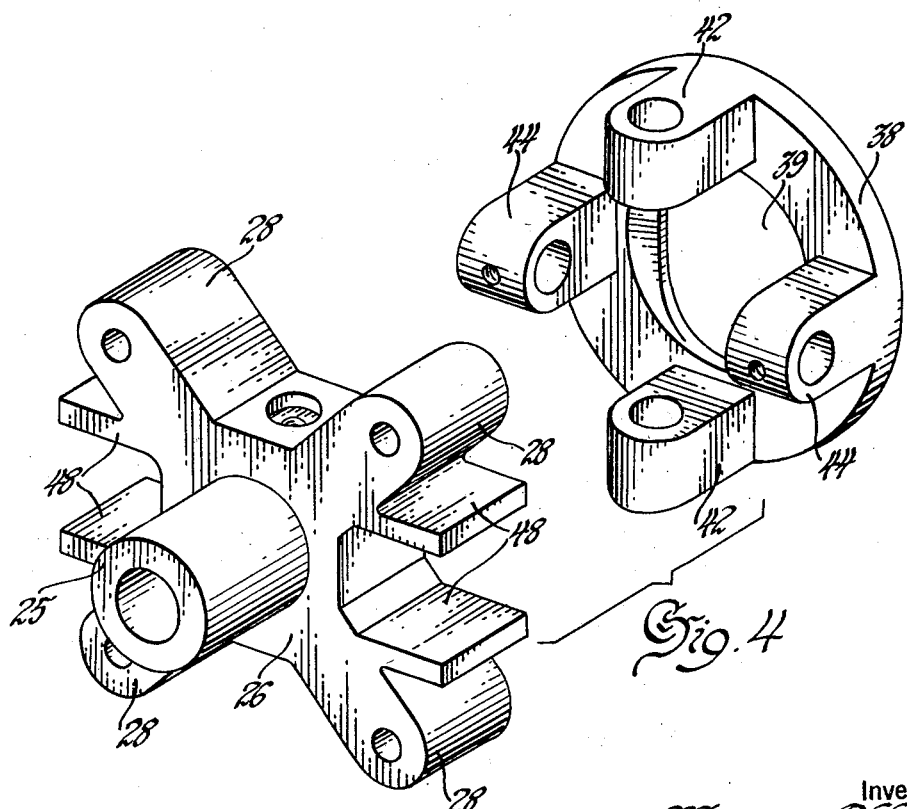
Inventor
Maurice Olley
By
J. C. Thorpe
Attorney United States Patent Office 2,803,140
Patented Aug. 20, 1957

2,803,140

WOBBLE PLATE ENGINE BALANCING MEANS

Maurice Olley, Detroit, Mich., assignor to General Motors Corporation, Detroit, Mich., a corporation of Delaware Application December 29, 1954, Serial No. 478,291

5 Claims. (Cl. 74—60)

This invention relates to internal combustion engines of the so-called "barrel" or "wobble plate" type wherein a plurality of cylinders are arranged in parallel or substantially parallel relation around the axis of the engine crankshaft and have pistons working therein whose axial movement is translated into rotary motion through connecting rods which act on a wobble plate journaled on a crankpin inclined to the crankshaft axis. Although the crankpin rotates in the wobble plate, the wobble plate undergoes only an angular swiveling motion relative to the cylinders as its axis swings about the intersection of the crankpin and crankshaft axes.

One of the difficulties which arise with this type of engine, however, is that due to the working pressures in the cylinders the axial thrust on the thrust bearings for the crank are, in many cases, intolerably high. It has been previously proposed to eliminate this problem of high axial thrust on the thrust bearings between the crankshaft and the engine casing by the addition of a so-called gimbal ring or other type of universal joint which is arranged intermediate the bearings of the shaft so as to engage the swivel or wobble plate through two trunnions and the engine frame or casing through two other trunnions at 90 degrees to the first. With this arrangement, however, the gimbal ring or universal joint, because of its mass, introduces a rocking couple which sets up vibrations in the engine which are undesirable and at high speeds may become dangerous.

It is, therefore, an object of the present invention to neutralize the rocking couple created by the mass of the gimbal or universal joint added to eliminate the high axial thrust occurring in wobble plate engines without such gimbal rings.

For a more complete understanding of this invention reference may be had to the accompanying detailed description and drawings, in which:

Fig. 3 is a view taken on line 3—3 of Fig. 2 and illustrates the pivotal connection between the wobble plate and the gimbal ring and the pivotal connection between the gimbal ring and the engine frame or housing.

Fig. 4 is an exploded view in perspective of the gimbal ring and wobble plate assembly illustrating the addition of masses to the wobble plate to translate the rocking couple of the gimbal into a rotary couple about the shaft to the engine.

Figure 1:
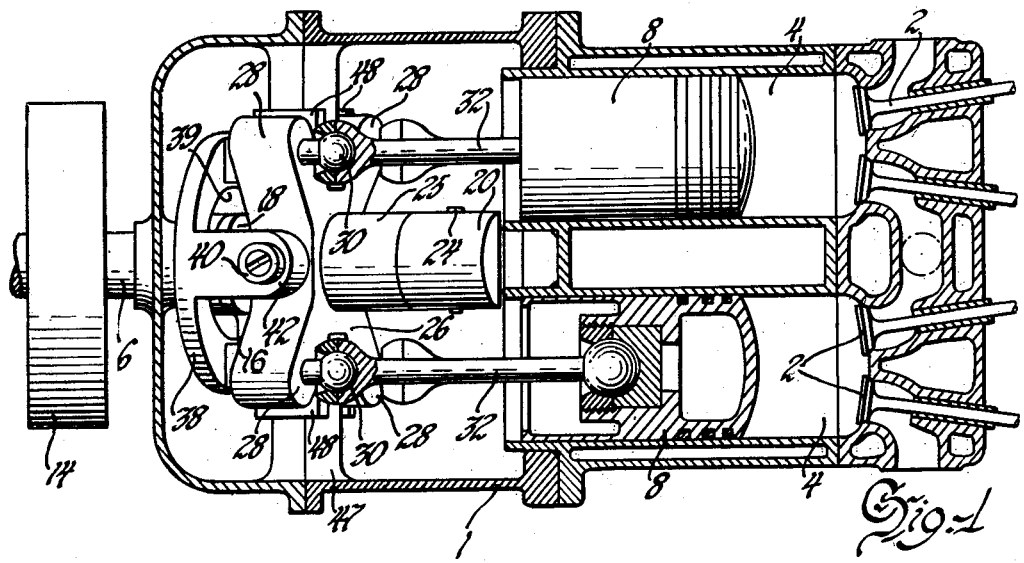
Fig. 1 is a sectional view in plan of a barrel-type of engine with the invention applied thereto.
Figure 2:
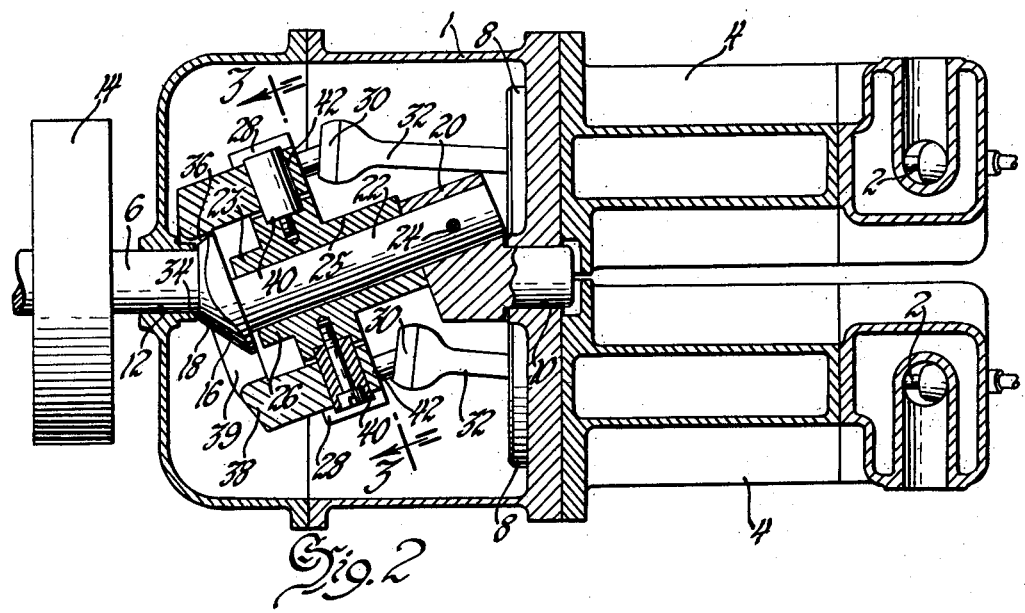
Fig. 2 is a sectional view in elevation of the engine.

Referring now to the drawings, a four-cycle "barrel" type engine is shown including a frame or casing 1 reciprocably supporting the usual intake and exhaust valves 2 porting the firing chambers located in the engine cylinders 4 in which reciprocate parallel to the axis of the engine shaft 6 the pistons 8. One end of the shaft 6 is journaled in a journal bearing recess 10 provided in the frame 1. The shaft 6 is also rotatably journaled in the engine housing 1 by means of the bearing recess 12 intermediate the flywheel 14 of the engine and the so-called Z-crank 16 which now appears to be the most common type of crank used with the so-called barrel engine. The crank 16 includes opposite diagonally opposed throws 18 and 20 connected together by means of a crank bearing shaft 22 and, in this case, a pin 24. Rotatably mounted on the bearing shaft 22 and restricted between the throws 18 and 20 by bosses 23 and 25 is the so-called wobble, swivel or swash plate 26 of the engine. In the present instance the barrel engine has four engine cylinders rectangularly spaced about the axis of the shaft of the engine. The wobble plate 26 has been provided with four extending ears 28, each one of which is connected to a piston 8 through the medium of a ball and socket universal joint 30 and a piston rod 32. The structure thus far described is sufficient to transmit a rotary motion to shaft 6 upon the usual progressive firing of the cylinders 4 about the axis of the shaft of the engine. It should be appreciated, however, that with the arrangement of the structure thus far described tremendous thrust forces will be created between the thrust surfaces 34, 36 on engine housing 1 and throw 18, respectively, due to the substantially longitudinal acting forces applied by means of the piston rods 32 to the wobble plate 26.

In order to alleviate this condition, a so-called gimbal ring or universal coupling 38 has been provided which is pivotally connected to the wobble plate 26 through the trunnions 40 and the bosses 42 and to the engine housing 1 through the medium of the bosses 44 anchoring trunnions 46 for rotation in the bearing bosses 47 on the engine frame 1 (see Fig. 3). With the addition of the gimbal ring, then, the axial thrust between the surfaces 34 and 36 is alleviated and the working pressures of the cylinders are transmitted through the gimbal ring to the engine casing by the trunnions 46 and the bosses 47. It will be observed that trunnions 46 and bosses 47 have their coincident axes at right angles to the coincident axes of the bosses 40 and 42 connecting the gimbal to the wobble plate. The gimbal ring 38 is of course provided with a central opening 39 in one end thereof of a size and configuration suitable to allow one end of the Z-crank 16 to extend through and rotate in without interference. The use of the gimbal ring, however, due to the rocking motion of its mass, introduces a rocking couple in a vertical plane through and containing the engine shaft axis. This plane also contains the axes of the trunnions 40 and bosses 42 pivotally connecting the wobble plate and gimbal ring. This rocking couple creates a reactive rocking couple acting on the shaft 6 and the bearings 10 and 12, also in the vertical plane through the axis of shaft 6. The present invention provides a novel way for easily balancing this rocking couple, which is accomplished as follows:

Referring particularly to Figs. 1, 3 and 4, it will be observed that suitable masses 48 have been added to the wobble plate 26. These additional masses 48, extending as they do substantially normal to the vertical plane through the axis of the shaft 6 and due to the substantially rocking motion of wobble plate 26, introduce another rocking couple at right angles to the rocking couple produced by the mass of the gimbal ring with, however, a 90 degree phase lag. Since the two couples are at right angles to each other and rise to maximums and subside to zero 90° out of phase with each other their resultant, when they are added together vectorially, is a simple couple which rotates with the shaft 6. As is well known, it is a simple matter to balance a shaft subject to a rotating couple by the addition of equal unbalance weights at either end of the shaft. In the present case, then, the resultant rotating couple is quickly and easily balanced by the addition of suitable counterweights to the ends of shaft 6, the balance weights not being shown in the present instance to aid in simplifying the disclosure.

What I claim is:

1. In a barrel type engine, the combination of a frame, spaced aligned bearings in said frame, a Z-crank journaled for rotation in said bearings and including a shaft adapted to gyrate about a fixed point, a wobbler mounted for rotation on said shaft, a gimbal pivotally secured to said wobbler and said frame for oscillatory movement in a plane through the axes of said bearings generating a rocking couple in said plane, and counterbalances on said wobbler generating a rocking couple in a plane through said axes at right angles to said first-mentioned plane 90° out of phase with said first-mentioned couple whereby the resultant of said couples is a rotating couple around the axis of said crank.

2. In a barrel type engine, the combination of a frame, aligned bearings in said frame, a Z-crankshaft journaled for rotation in said bearings and including between throws of said crankshaft an inclined shaft adapted to gyrate about a fixed point on the axis of said crankshaft, a wobbler mounted for rotation on said inclined shaft normal to the axis thereof, a gimbal pivotally secured to said wobbler and frame for oscillatory movement in a plane through the axis of said crankshaft generating a harmonic rocking couple in said plane, said wobbler having a mass generating a harmonic rocking couple in a plane through the axis of said crankshaft at right angles to said first-mentioned plane 90° out of phase with said first-mentioned couple whereby the resultant of said couples is a rotary couple rotating around the axis of said crank.

3. In a barrel type engine, the combination of a frame, aligned bearings in said frame, a Z-crankshaft journaled for rotation in said bearings and including between throws of said crankshaft an inclined shaft adapted to gyrate about a fixed point on the axis of said crankshaft, a wobbler mounted for rotation on said inclined shaft normal to the axis thereof, a gimbal pivotally secured to said wobbler and frame for oscillatory movement in a plane through the axis of said crankshaft generating a rocking couple in said plane, said wobbler having masses thereon in the form of fingers on opposite sides thereof extending normal to the axis of said inclined shaft on opposite sides of said last-mentioned plane, said masses generating a rocking couple in a plane through the axis of said crankshaft at right angles to said first-mentioned plane 90° out of phase with said first-mentioned couple whereby the resultant of said couples is a rotary couple rotating around the axis of said crank.

4. In combination, a crankshaft including aligned bearing portions coinciding with the axis of rotation thereof and an inclined shaft portion between said aligned portions, an engine frame including a plurality of cylinders circularly spaced around the axis of rotation of said shaft with the axes of said cylinders parallel to said axis of rotation and further including bearings in which said bearing portions are journaled for rotation, reciprocating pistons in said cylinders, a wobble plate mounted for rotation on said inclined shaft portion normal to the axis thereof, means coacting with said pistons and said wobble plate, a gimbal universally connecting said wobble plate to said frame and thereby generating a rocking couple in a plane through said bearing portions, and masses on said wobble plate generating a rocking couple at right angles to and 90° out of phase with said first-mentioned rocking couple whereby the resultant of said couples is a rotary couple rotating around said axis of rotation.

5. In combination, a crankshaft having a shaft portion inclined to the axis thereof, a first member journaled on said shaft portion and adapted to receive and transmit thrust longitudinally of the crankshaft axis at spaced-apart points thereon about the crankshaft axis, a second member having a fixed pivotal axis perpendicularly intersecting the crankshaft axis and connected to said first member for pivotal movement relative thereto about a movable axis perpendicularly intersecting said fixed pivotal axis, a mass on said first member disposed to generate a rocking couple about said movable axis at right angles to and 90° out of phase with the rocking couple generated by said second member about said fixed axis so that the resultant of said couples is a single rotating couple about a crankshaft axis.

References Cited in the file of this patent

UNITED STATES PATENTS

| | | |
|---|---|---|
| 1,011,126 | Jones | Dec. 5, 1911 |
| 1,968,470 | Szombathy | July 31, 1934 |